United States Patent
Hill, Jr. et al.

(10) Patent No.: US 7,047,286 B2
(45) Date of Patent: May 16, 2006

(54) METHOD OF MODIFYING A LOGICAL LIBRARY CONFIGURATION FROM A REMOTE MANAGEMENT APPLICATION

(75) Inventors: Ronald F. Hill, Jr., Tucson, AZ (US);
Ralph T. Jackson, Tucson, AZ (US);
Kevin L. Schwartz, Tucson, AZ (US);
Jennifer C. Somers, Tucson, AZ (US);
Bryan J. Wright, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 10/171,179

(22) Filed: Jun. 13, 2002

(65) Prior Publication Data

US 2003/0233430 A1    Dec. 18, 2003

(51) Int. Cl.
*G06F 15/16* (2006.01)
(52) U.S. Cl. ....................... 709/220; 709/221; 709/226
(58) Field of Classification Search ........ 709/220–224, 709/226, 228, 250; 715/700, 736, 739, 740, 715/744; 713/2, 100
See application file for complete search history.

(56) References Cited

U.S. PATENT DOCUMENTS

| 5,481,706 | A |   | 1/1996  | Peek |
| 5,613,154 | A | * | 3/1997  | Burke et al. .................... 710/1 |
| 5,911,148 | A | * | 6/1999  | Anglin et al. ................ 711/111 |
| 6,041,329 | A |   | 3/2000  | Kishi |
| 6,185,165 | B1 | * | 2/2001  | Jesionowski et al. .... 369/30.34 |
| 6,425,059 | B1 | * | 7/2002  | Basham et al. ............. 711/153 |
| 6,487,713 | B1 | * | 11/2002 | Cohen et al. ................ 717/105 |
| 6,665,714 | B1 | * | 12/2003 | Blumenau et al. .......... 709/222 |
| 6,725,352 | B1 | * | 4/2004  | Goodman et al. .......... 711/173 |
| 6,769,010 | B1 | * | 7/2004  | Knapp et al. ................ 709/203 |
| 6,779,083 | B1 | * | 8/2004  | Ito et al. ...................... 711/114 |
| 6,839,747 | B1 | * | 1/2005  | Blumenau et al. .......... 709/223 |
| 6,850,253 | B1 | * | 2/2005  | Bazerman et al. .......... 715/734 |

OTHER PUBLICATIONS

Gregory Karvounarakis, et al. "Submission And Repository Management of Digital Libraries, Using WWW", Computer Networks, vol. 34, Issue 6, pp. 861-872.

* cited by examiner

*Primary Examiner*—Ario Etienne
*Assistant Examiner*—Sargon Nano
(74) *Attorney, Agent, or Firm*—Scully, Scott, Murphy & Presser, P.C.; John Kennel, Esq.

(57) ABSTRACT

A method for modifying a logical library configuration from a remote management application which reduces the number of separate UI display panels a user has to view, and also reduces the number of pages requested from the server. A single UI display panel displays a configuration of all logical libraries of a similar media type in the single display panel. The configuration of all logical libraries of a similar media type can be modified within a configuration range, wherein a modification of one logical library results in the display panel displaying the effects of the modification on other defined logical libraries. For each separate logical library, the single UI display panel displays its allocated number of drives, its allocated number of storage slots, and its allocated number of control ports. The validity of a selected configuration is checked by automatically adjusting the hardware allocation of other effected libraries whenever the configuration of one logical library is changed.

10 Claims, 8 Drawing Sheets

| | Frames | Drives | Storage Slots | I/O Slots | Control Ports |
|---|---|---|---|---|---|
| LTO | 5 | 41 | 1610 | 10 | — |
| DLT | 1 | 31 | 1100 | 20 | 13 |
| TOTAL | 6 | 72 | 2710 | 30 | 13 |

Verify that this is your current configuration. If you agree, click Next to continue.

If this does not reflect your physical configuration, you can choose Retry to perform another physical device discovery.

*FIG. 2*

| Library | Type | Drives | Storage Slots | Control Ports |
|---------|------|--------|---------------|---------------|
| 1 | LTO | 4 | 250 | – |
| 2 | LTO | 6 | 150 | – |
| 3 | LTO | 3 | 230 | – |
| 4 | LTO | 7 | 170 | – |
| 5 | LTO | 2 | 110 | – |
| 6 | LTO | 8 | 182 | – |
| 7 | LTO | 4 | 5 | – |
| 8 | LTO | 7 | 13 | – |
| 9 | DLT | 7 | 235 | 1 |
| 10 | DLT | 3 | 165 | 3 |
| 11 | DLT | 4 | 202 | 1 |

Review your new logical library configuration.
If you agree, click Next to continue

[<Back]  [Next>]  [Cancel]

*FIG. 6*

METHOD OF MODIFYING A LOGICAL LIBRARY CONFIGURATION FROM A REMOTE MANAGEMENT APPLICATION

BACKGROUND OF THE INVENTION

1. Field of the Invention

The present invention relates generally to a method of modifying a logical library configuration from a remote management application, and more particularly pertains to a method of displaying and modifying a logical library (partition) configuration of a 3584 removable media tape library from a web-based remote management application.

A media tape library can include a plurality of storage tapes of data and information in different media types, such as DLT tape cartridges or LTO tape cartridges, which are stored in storage slots. An automated tape cartridge gripper can insert a selected tape cartridge into a drive for retrieving (reading) data from the tape cartridge or storing (writing) data into the tape cartridge. A media tape library typically can include a web server, and a control program for running and controlling operation of the logical library. The web server enables remote access from a remote web browser. A media tape library typically can include tape grippers, tape media, tape drives, hard drives, control ports and disk arrays.

2. Discussion of the Prior Art

The 3584 media tape library is a product available from IBM Corporation, and is described in U.S. patent application Ser. No. 09/878,469, filed Jun. 11, 2001 for Method To Partition A Data Storage And Retrieval System Into One Or More Logical Libraries. An existing method used on the 3584 removable media tape library operates by displaying multiple UI (User Interface) display panels, with each display panel being specific to a single logical library. For example, the 3584 operator panel displays two UI display panels for each logical library, a first display panel for "how many drives do you want?," and a second display panel for "how many storage slots do you want?". A user must iterate one at a time through 2 UI display panels for each logical library, starting with the first logical library, and then proceed in a set sequence through n logical libraries. A user who wants to make a change to a previous selection for a logical library must back up sequentially through all of the UI display panels, in the reverse set sequence, until the desired UI display panel is reached.

SUMMARY OF THE INVENTION

A primary object of the present invention is to provide a method for modifying a logical library configuration from a remote management application which reduces the number of separate UI display panels a user has to view, and also reduces the number of pages requested from the server for the logical library. The subject invention allows a user to view a proposed configuration of all logical libraries of a similar media type in a single UI display panel, and also allows modifications of any logical library using the same single UI display panel.

The number of UI display panels is reduced by combining and reducing the number of steps necessary to configure a media tape library by a configuration wizard. The configuration wizard comprises a sequential set of UI display panels, each of which is launched in a pop-up window display.

A parent HTML (Hyper Text Mark-up Language) page launches the configuration wizard, and also creates a JavaScript object which initially represents the current library configuration. The JavaScript object can be subsequently modified by a user to represent a new library configuration as specified by the user. All web pages within the configuration wizard can access and update the JavaScript object, which avoids passing a large amount of data from display panel to display panel, as in the prior art. The initial data is retrieved from the server only once, and is then stored and possibly modified on the client computer, and is then resubmitted back to the server only once, after all configuration changes are completed.

A single UI display panel allows a user to view and modify a configuration of all logical libraries of a similar media type within a configuration range available for logical libraries of that similar type.

The present invention allows a user to modify a configuration of all logical libraries by using a single UI display panel. The user can modify any one logical library and can immediately see how that change affects other defined logical libraries. This reduces the time it takes for the user to modify the configuration of a logical library.

For a web-based application, reducing the number of UI display panels to one reduces network traffic and server processing because there is only one page request from the user browser to the server, instead of many page requests as in the prior art.

BRIEF DESCRIPTION OF THE DRAWINGS

The foregoing objects and advantages of the present invention for a method of modifying a logical library configuration from a remote management application may be more readily understood by one skilled in the art with reference being had to the following detailed description of a preferred embodiment thereof, taken in conjunction with the accompanying drawings wherein like elements are designated by identical reference numerals throughout the several views, and in which:

FIG. 2 illustrates a first displayed UI display screen of the configuration wizard, entitled Current Physical Configuration, which shows for each type LTO and DLT, the number of Frames, the number of Drives, the number of Storage Slots, the number of I/O Slots, and the number of Control Ports.

FIG. 6 illustrates a next displayed UI display screen, entitled Review Configuration, which shows for each of Logical Libraries 1-n, each Type, the number of Drives, the number of Storage Slots, and the number of Control Ports.

DETAILED DESCRIPTION OF THE INVENTION

The following detailed description of the invention refers to and employs the following technologies.

A browser is a program that enables a user to navigate the World Wide Web (WWW). The two leading browsers are Netscape Navigator and Microsoft Internet Explorer. A browser serves as the client for Web and other types of Internet servers. Increasingly, browsers are becoming the interface of choice for the various types of data accessible by means of networks based on Internet technology. A web browser is a program that runs on an Internet-connected computer and that provides access to the World Wide Web (WWW).

In a client/server network, a server is a computer or program that is dedicated to providing information in response to external requests. On the Internet, a server is a program that supplies information when it receives external requests via Internet connections. In the World Wide Web (WWW), a web server is a program that accepts requests for information framed according to the HyperText Transport Protocol (HTTP). The web server processes these requests and sends the requested document.

HTML is an acronym for HyperText Markup Language which is a markup language for identifying portions of a document (called elements) so that, when accessed by a web browser, each portion appears with a distinctive format. HTML is the markup language behind the appearance of documents on the World Wide Web (WWW).

JavaScript is a scripting language for Web publishing, by Netscape Communications, that enables Web authors to embed simple java-like programming instructions within the HTML text of their Web pages. JavaScript is a simple interpreted language that requires its own interpreter, which is normally built into most popular Web browsers.

Figure 5:
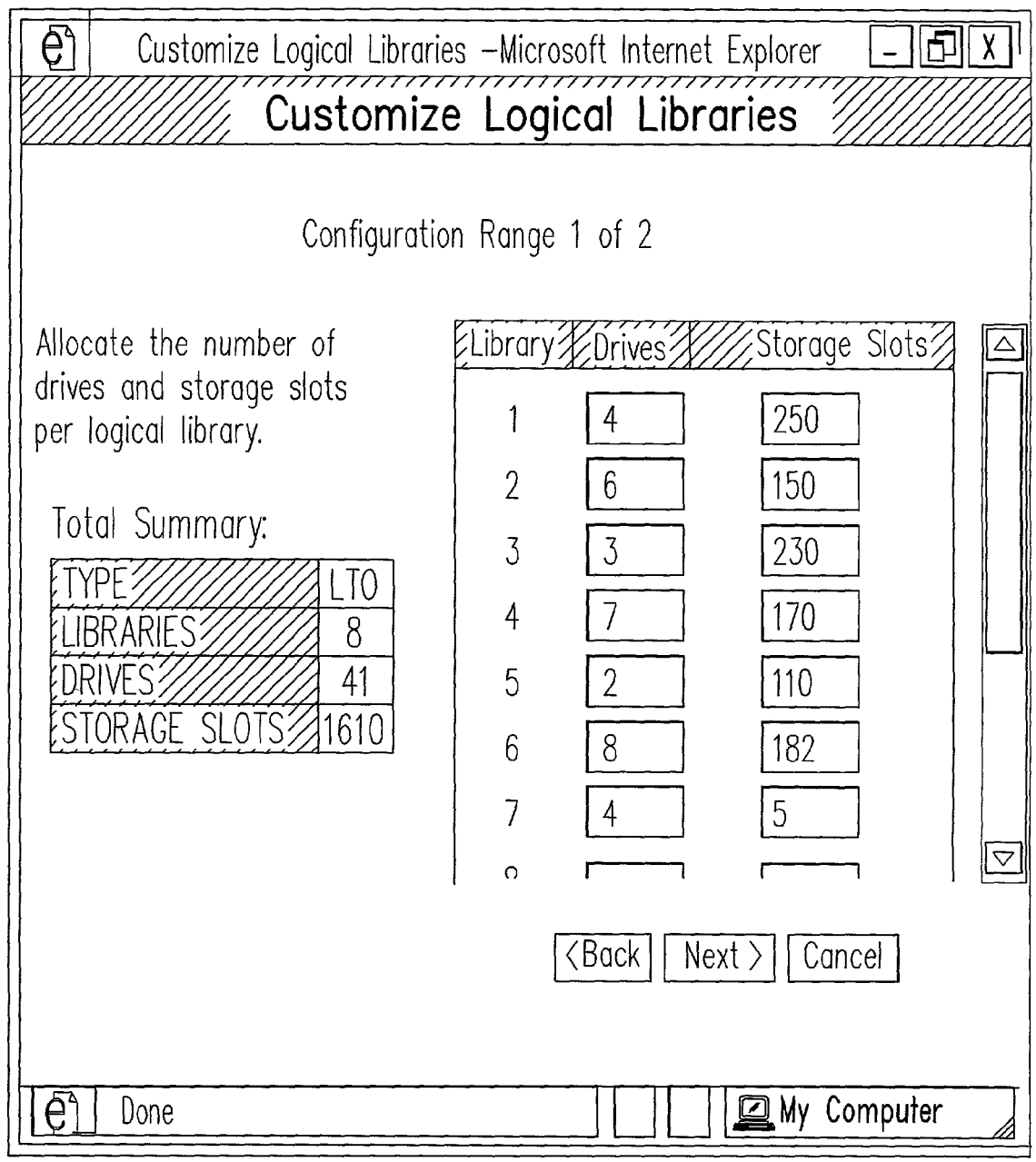
FIG. 5 illustrates a next displayed UI display screen of the configuration wizard, entitled Customize Logical Libraries, for Configuration Range 1 of 2, which shows on the right the number of Library Drives and Storage Slots allocated to each of the Libraries 1–8, and shows on the left a Total Summary for Type LTO.

The present invention allows a user to modify the configuration of any logical library within an available configuration range of all logical libraries of a similar media type (e.g. LTO tape cartridges (shown as Type LTO in FIG. 5) or DLT tape cartridges. FIG. 5 illustrates the Configuration Range 1 of 2 for LTO tape cartridges, displayed at the top of the display panel, with the configuration range 2 of 2 being for DLT tape cartridges.

The present invention ensures the validity of a selected configuration by automatically adjusting the hardware allocation of other effected libraries whenever the configuration of one library is changed. The validation occurs whenever a user makes a change to the number of drives or storage slots and then moves to another field.

An increase or decrease of a hardware allocation for a given library by a user affects the hardware allocations for other logical libraries of a similar media type since the total available hardware for the physical library is fixed. An allocation algorithm specifies that if a hardware allocation is increased for a given library, then hardware allocations for other libraries of a similar media type are decreased (down to 1, if necessary) until the hardware allocation increase is satisfied. For example, in the UI display screen of FIG. 5, if the user increased the number of storage slots allocated to library 2 from 150 to 230, which is an addition of 80 storage slots, then as many storage slots as are available are taken from the allocation for logical library 3; and if the increase is not satisfied then as many storage slots as are available are taken from the allocation for logical library 4, and etc. In a similar manner, if the number of storage slots allocated to a given library is decreased, then the newly available storage slots resulting from the decrease could also be allocated to other logical libraries.

For DLT configuration ranges, the allocations of drives and control ports are slightly more complicated than storage slots because a control port-to-drive mapping relationship exists between drives and controls ports which lays out a sequence of control ports and drives for a given partition. In the web environment, this mapping is represented by a string a Cs (Control ports) and Ds (Drives) (e.g. CCDDDCDC-CCDDCDD). Mappings can be broken into segments where a segment is one or more Cs followed by one or more Ds. An exemplary mapping of CCDDDCDCCCDDCDD includes the following four segments CCDDD, CD, CCCDD, and CDD. Each logical library must have at least one segment. The choices that appear in the drop-down boxes for drives in FIG. 5 are dependent upon the mapping. Adding a segment to a logical library also results in adding to that logical library the number of drives and the number of control ports, which are taken from the segment physically following the segment for the logical library that is being increased. This is because the IBM 3584 removable media tape library is designed to look at the segments in a fixed order, and so it looks to the next segment to add to the available number of supply drives and control ports of the previous segment. The same allocation algorithm used for storage slots is used to satisfy a request for supply drives and control ports.

Figure 1:
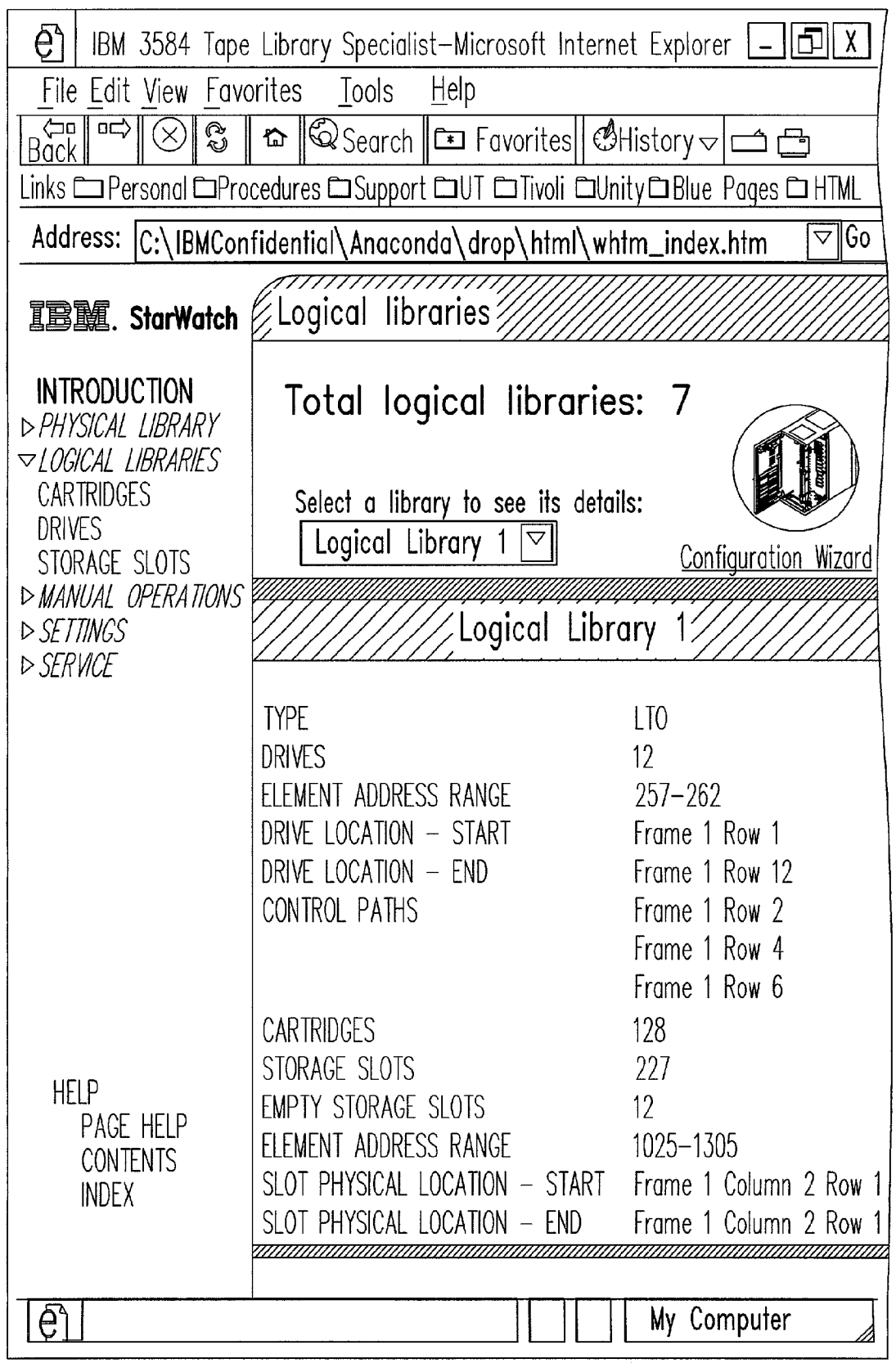
FIG. 1 illustrates an introductory parent HTML page of the configuration wizard, entitled Logical Libraries, which shows a total number of logical libraries of 7, and shows a selection of Logical Library 1.

FIG. 1 illustrates an introductory parent HTML page of the configuration wizard, entitled Logical Libraries, which shows a total number of logical libraries of 7, and shows a selection of Logical Library 1, as a Type LTO; with Drives totaling 12; an Element address range of 257–262; a Drive location—START of Frame 1, Row 1; a drive location—END of Frame 1, Row 12; Control paths of Frame 1, Row 2, Frame 1, Row 4 and Frame 1, Row 6; Cartridges totaling 128; Storage slots totaling 227; Empty storage slots totaling 14; an Element address range of 1025–1305; a Slot physical location—START at Frame 1, Column 2, Row 1; and a Slot physical location—END at Frame 1, Column 2, Row 1. The Configuration Wizard displayed in the upper right of FIG. 1 is a hyperlink which the user can click on to proceed with the Configuration Wizard.

FIG. 2 illustrates a first displayed UI display screen of the configuration wizard, entitled Current Physical Configuration, which shows that type LTO has 5 Frames, 41 Drives, 1610 Storage Slots, 10 I/0 Slots, and 0 Control Ports; and type DLT has 1 Frame, 31 Drives, 1100 Storage Slots, 20 I/0 Slots, and 13 Control Ports; for a Total of 6 Frames, 72 Drives, 2710 Storage Slots, 30 I/0 Slots, and 13 Control Ports.

The user can thus verify that this is the user's current physical configuration, and if the user agrees, clicks Next to continue. If the displayed current physical configuration does not reflect the user current physical configuration, the user can click Retry to perform another physical device discovery.

Figure 3:
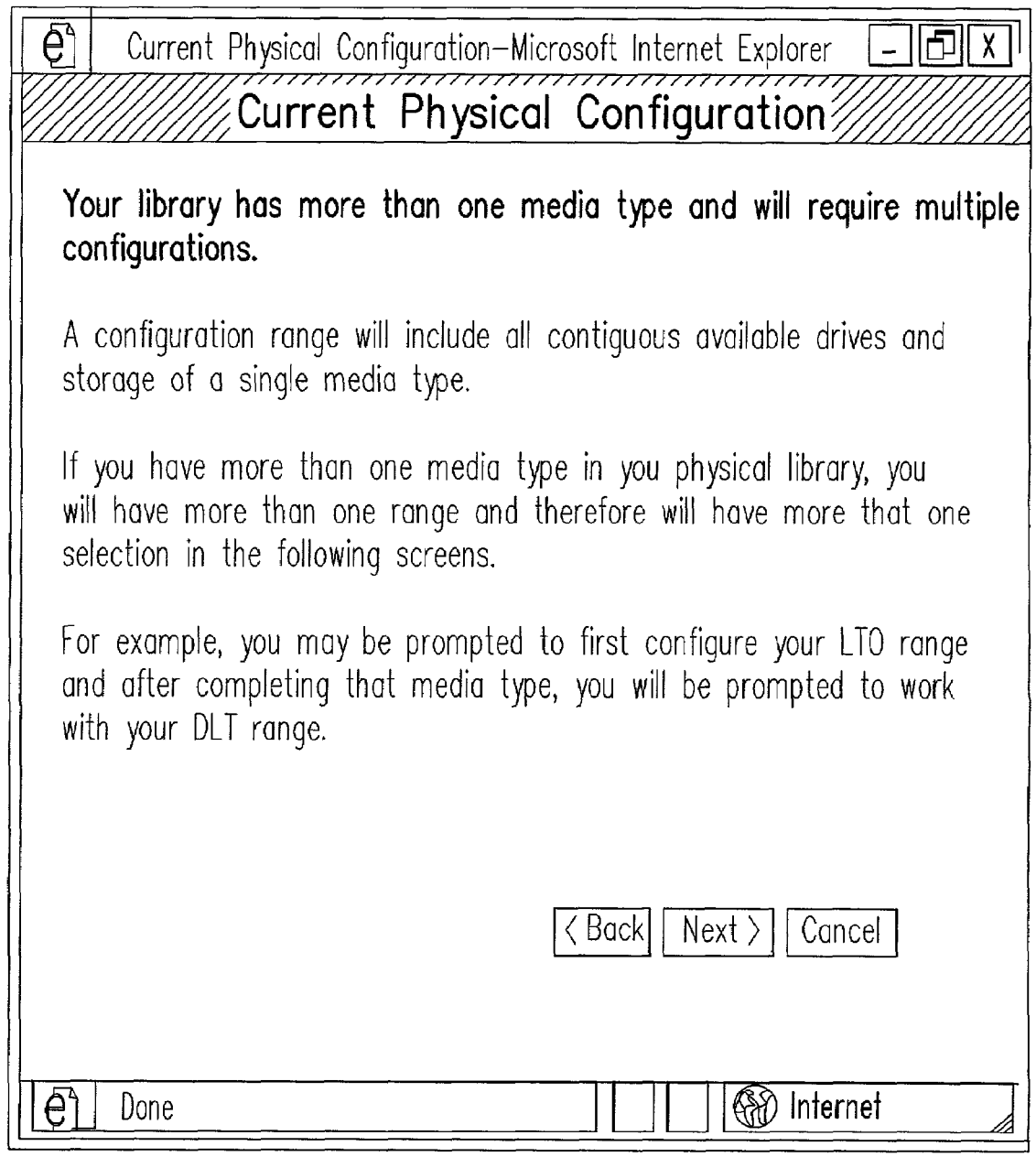
FIG. 3 illustrates a second displayed UI display screen of the configuration wizard, entitled Current Physical Configuration, which explains that the user library has more than one media type and will require multiple configurations.

FIG. 3 illustrates a second displayed UI display screen of the configuration wizard, entitled Current Physical Configuration, which explains that the user library has more than one media type and will require multiple configurations. It explains that a configuration range will include all contiguous available drives and storage of a single media type, and that if there is more than one media type in the user physical library, the user will have more than one range and therefore will have more than one selection in the following screens UI display screens of FIGS. 4 and 5. For example, the user may be prompted to first configure the user LTO range, and after completing that media type, the user will be prompted to work with the user DLT range.

Figure 4:
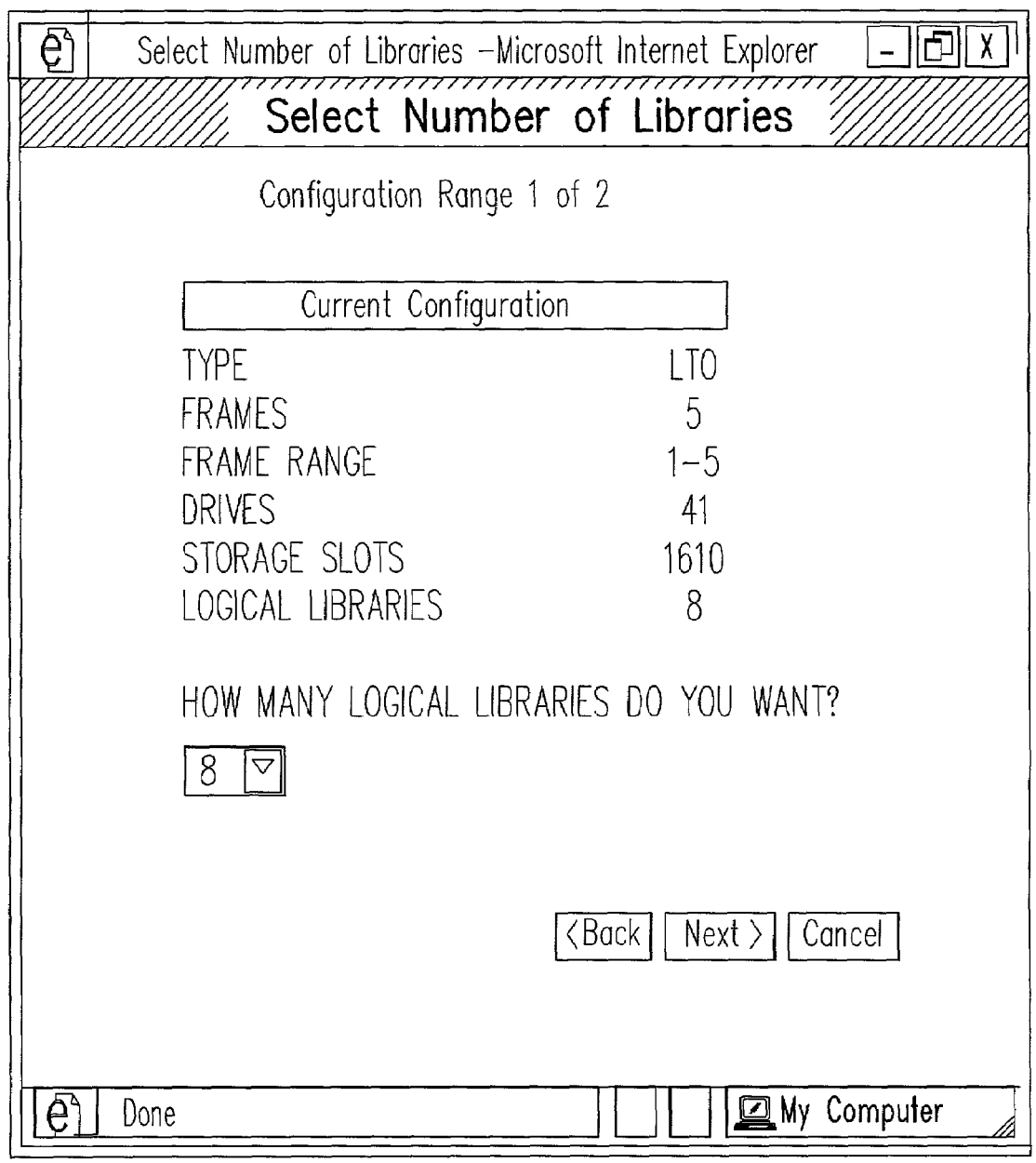
FIG. 4 illustrates a next displayed UI display screen of the configuration wizard, entitled Select Number of Libraries, for Configuration Range 1 of 2, and shows a Current Configuration for Type LTO logical libraries.

FIG. 4 illustrates a next displayed UI display screen of the configuration wizard, entitled Select Number of Libraries, for Configuration Range 1 of 2, and shows a Current Configuration Type of LTO, Frames totaling 5, a Frame range from 1–5, Drives totaling 41, Storage slots totaling 1610, and Logical libraries totaling 8. The UI display screen prompts the user to select the number of logical libraries desired.

FIG. 5 illustrates a next displayed UI display screen of the configuration wizard, entitled Customize Logical Libraries, for Configuration Range 1 of 2, which instructs the user to allocate the number of drives and storage slots per logical library. This UI display screen shows on the right the number of Library Drives and Storage Slots allocated to each of the Libraries 1–8, and shows on the left a Total Summary for Type LTO, having Libraries totaling 8, Drives totaling 41, and Storage Slots totaling 1610.

In the use of the configuration wizard, the UI display screens of FIGS. 4 and 5 would be repeated for each different Configuration Range, such as for a Configuration Range 2 of 2.

Following the repetition of UI display screens of FIGS. 4 and 5 for each configuration range, the configuration wizard next displays the UI display screen of FIG. 6, entitled Review Configuration, which shows for each of Logical Libraries 1-n, each Type, the number of Drives, the number of Storage Slots, and the number of Control Ports. The user is instructed to review the new logical library configuration, and if the user agrees, to click Next to continue.

Figure 7:
FIG. 7 illustrates the next UI display screen of the configuration wizard, entitled Accept Configuration, which instructs the user that if the user has completed selecting a new configuration, the user's prior configuration will be replaced with the new configuration.

FIG. 7 illustrates the next UI display screen of the configuration wizard, entitled Accept Configuration, which instructs the user that if the user has completed selecting a new configuration, the user's prior configuration will be replaced with the new configuration. To apply the new configuration, click Finish, after which a final UI display panel, not shown, advises that the library is now successfully configured.

Figure 8:
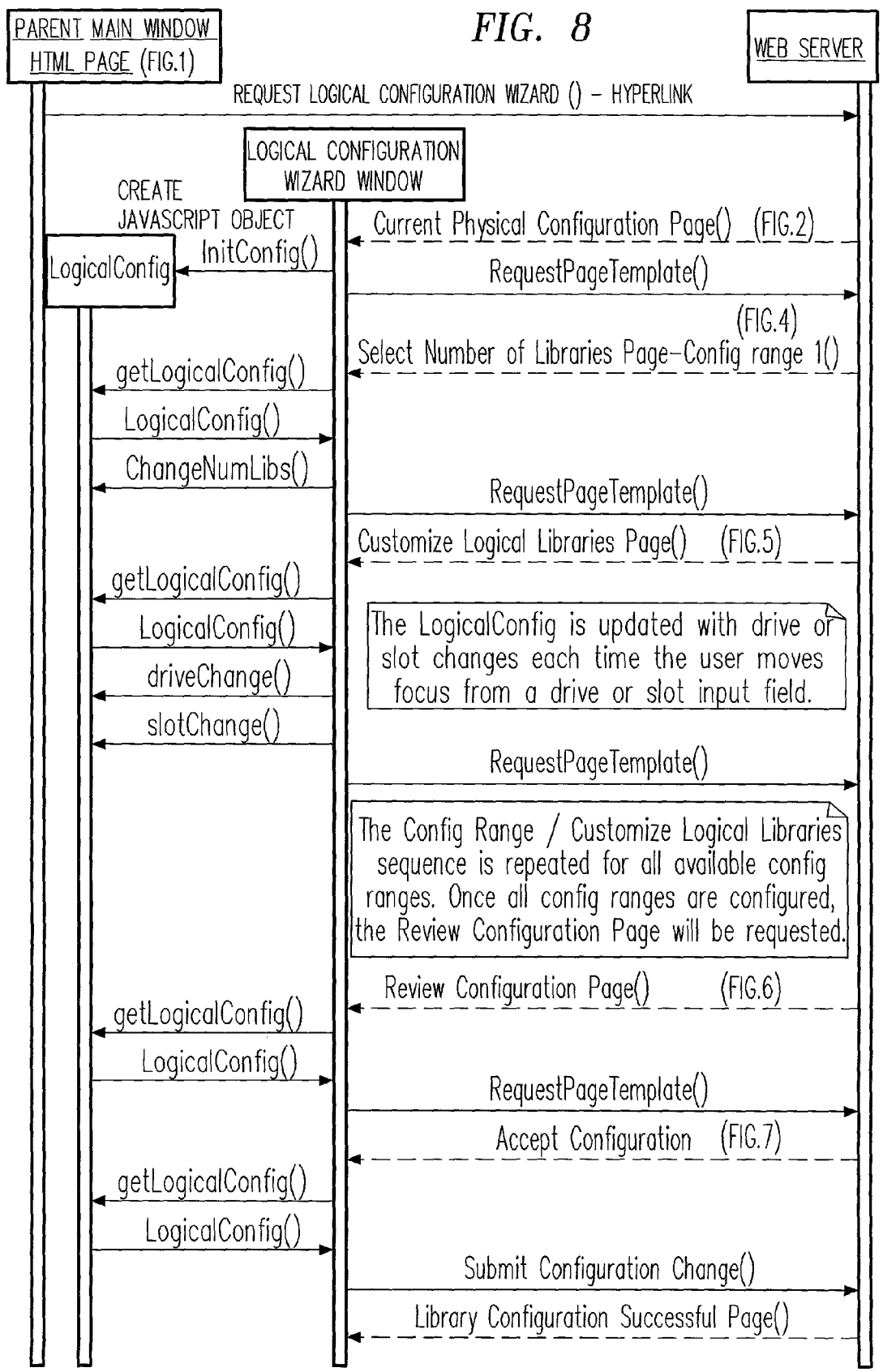
FIG. 8 illustrates the sequential steps executed by the configuration wizard.

FIG. 8 illustrates the sequential steps executed by the configuration wizard wherein, after the parent HTML page of FIG. 1 is displayed and a user clicks on the Configuration Wizard hyperlink of FIG. 1, a web server sends the Current Physical Configuration Page of FIG. 2, which is stored and displayed it in the UI display window. Then the user/configuration wizard requests the next Page Template, and the web server sends to the user the Select Number of Libraries Page of FIG. 4 for the Configuration Range 1 of 2. The user can then get the Logical Configuration, and change the number of libraries. The user/configuration wizard then requests the next Page Template from the web server which supplies the Customize Logical Libraries Page of FIG. 5, and the user/configuration wizard then gets the Logical Configuration for a drive Change or a slot Change.

The Logical Configuration is updated with drive or a slot changes each time the user moves focus from a drive or slot input field. The user/configuration wizard then supplies the Request Page Template to the web server.

The Configuration Range/Customize Logical Libraries sequence is repeated for all available configuration ranges (e.g. 1 of 2, 2 of 2). Once all configuration ranges are reconfigured, the configuration wizard requests the Review Configuration Page from the web server.

The web server then sends the Review Configuration of FIG. 6 to the user, who gets the Logical Configuration. The configuration wizard requests the next Page Template from the web server, and the web server supplies the Accept Configuration of FIG. 7 to the user/configuration wizard. Next, the user/configuration wizard submits a Configuration Change to the web server, and the web server supplies the final Library Configuration Successful Page to the user/configuration wizard indicating successful completion of modifications to the logical libraries.

The Key functions used by the Current Physical Library Page are as follows.

For the Initial Configuration:

Fill the logical Configuration object created by parent window (logical.htm) from the hidden variables set by the server which enumerate the configuration ranges and logical libraries. Split out the individual fields within both the configuration range and the logical library array which are comma delimited strings. For each configuration range, based upon the field which specifies the number of logical libraries for the configuration range, create new libraries and add them to the configuration range. Then create the new configuration range. If the configuration range is DLT, break the DLT control port/drive mapping into segments.

For the function of fill DLT segments, create the DLT segment arrays. The DLT mapping string may look something like this:

DDDDDCCDDDDDCDDDDDCCCDDDDCDDD. Convert this string into 2 arrays which represent the number of drives and control ports for each mapping segment, wherein a segment is one or more Cs followed by one or more Ds.

The algorithm counts consecutive Cs, then counts consecutive Ds, then adds the count of consecutive Cs to the DLT segment Control Ports array, and the count of Ds to the DLT segment Drives array, and repeat until the string ends.

The following are the key functions used by the Select Number of Libraries Page: For the function changeNumLibs (libs), Strategy for changing the number of logical libraries for a configuration range,

LTO:

Increasing the Number of Libraries:

If the number of new hardware drives is equal to or exceeds the number of additional libraries, allocate a single drive to the first n−1 new libraries and any remaining new drives to the nth (last) new library.

If the number of new hardware drives is less than the number of additional libraries, first calculate the number of drives needed to take from existing libraries that will allow for one drive in each new library. The allocation algorithm is to start with the last existing library and take as many drives as needed, but leaving at least one drive. If the last library doesn't provide enough drives, go to the next to last library and take. Keep climbing up libraries and take until you have enough. Note that since the user will not be allowed to select more logical libraries than there are drives, eventually the taking process will terminate successfully. Note also that if drives were removed since last configuration (new hardware drives is negative), they will be taken from above libraries and not re-allocated, thus removing them.

Decreasing the Number of Libraries:

If there are removed drives, take them from libraries above.

Add up the number of drives from the libraries now not in the picture (if decrease from 5 to 2, then the last three libraries are considered not in the picture and will be removed).

Add to that the number of new hardware drives. Take this total and add it to the last library in the picture.

Note: same strategy is used to allocate storage slots as for drives.

DLT:

First, if there is new hardware, convert the mapping (i.e. ccdddcd ..) into segments and add them to end of this configuration range.

Increasing the Number of Libraries:

If the number of new segments is greater than or equal to the number of additional libraries, allocate a single segment to each of the first n−1 new libraries and any remaining new segments to the nth (last) new library.

If the number of new hardware drives is less than the number of additional libraries, first allocate all (if any) new hardware segments to the last current library. Then starting with the first new library, add it to the config range, and take one segment from the library above it. If the library above now has no segments, then it must in turn take one segment from the library above. This could set off a chain reaction but eventually an above library that is having a segment taken will have the slack to handle it.

Decreasing the Number of Libraries:

Add up the number of drives, control ports, and segments from the libraries now not in the picture.

Then add to those totals any new hardware.

Then add all these totals to the last library in the picture.

Note: The segments total will be add to the slack for the last library in the picture.

Storage slot allocation amongst logical libraries for DLT is the same as for LTO;

The following are the key functions used by the Customize Logical Libraries Page:

for the function takeSegment(takeFromLib, takeToLib),
takeFromLib: Library to be taken from
takeToLib: Library that is doing the taking
Strategy:

If taking from above library (adding logical libraries or decreasing drives in a library), then will always take last segment.

If taking from below library (increasing drives in a library), then will always take first segment.

In either case subtract the number of drives, slots, and control ports in the segment from the taking-from library and add them to the taking-to library. Then readjust the starting segments for both libraries and readjust the slack for both libraries.

If the library being taken from now has no segments, its slack and startSeg properties will get set to −1

NOTE: taking is always done from the library directly above or below

For the function reAllocateSegments(userModifiedLib, segmentDelta),
userModifiedLib: the library whose drives the user just requested to be altered
segmentDelta: the number of segments to be increased or decreased by
Strategy:

If increasing segments, take from below lib, one segment at a time until requested number of segments have been taken. Each time a segment is taken from a library, if that library now has no segments, it must in turn take a segment from below. The gloomy case where no free segment can be found should never occur since the drive drop-down boxes for each library are built based upon the total slack in the configuration range.

If decreasing segments, simply give all the segments to the library below. The gloomy case where a library loses all its segment should never occur since the drive drop-down selections are built with the premise that a library may not give away all its segments (must keep at least one).

Refresh the drives choices in drop-down boxes for all libraries by invoking fillDriveDropDownForLib( ).

Refresh the control port values for each library by invoking fillControlPortDropDownForLib( ).

The following are the key functions used by the Customize Logical Libraries Page (Continued):

For the function fillDriveDropDownForLib( ),
libNum: the library number whose drop-down for drives is being built.
Strategy:

Clear the drive drop-down box for library since this routine gets invoked after user changes drive
allocations as well as for initial setup.

You can not directly give up or add segments to the last library in a configuration range, so if this is the last library in the configuration range, add only the Current number of drives allocated to the library to the drive drop-down box.

For every other library in a configuration range, you can directly give up or add segments based on choices selected using that library's drop-down boxes.

For example, given a drive drop-down box with the following choices:

1
3
8
10
14

8 is the current number of drives allocated to the library and is the current selection. The numbers 1 and 3 represent choices where the library would be giving up drives to the following library. The numbers 10 and 14 represent choices where the library would be picking up slack drives from following libraries. In this example, the 8 drives allocated to this library come from 3 segments, 1 segment that can't be given up, and 2 slack segments. Segment 1 contains 1 drive, segment 2 contains 2 drives (1+2=3), and segment 3 contains 5 drives (1+2+5=8). There are 2 available slack segments allocated to the following libraries. Segment 4 contains 2 drives (8+2=10), and segment 5 contains 4 drives (8+2+4=14).

1. The drive drop-down box is filled first with the choices from available segments making up the current number of drives allocated to the library.
   1. A. This can be accomplished by starting with the current number of drives allocated to this library and iteratively subtracting the number of drives in each segment making up the current allocation, starting with the last segment, and storing them in a temporary array.

Using the above example, this would look like:
   TmpArray[0]=8−5 (current number of allocated drives−number of drives in the 3rd segment)
   TmpArray[1]=3−2 (remaining number of allocated drives−number of drives in the 2nd segment)
   The temporary array would then be accessed in reverse order in order to keep the drive-drop down in ascending order:
   Drive drop-down [0]=TmpArray[1]
   Drive drop-down [1]=TmpArray[0]

And then the current number of allocated drives would be added to the drive-drop down:
Drive drop-down [2]=8
1. B. An alternative approach would be to fill the drive drop-down by starting with the 1st segment making up the current allocation, and iteratively adding the number of drives in each segment making up the current allocation.

Using the above example, this would now look like:
Drive drop-down [0]=1 (number of drives in the 1st segment)
Drive drop-down [1]=1+2 (running total+number of drives in the 2nd segment)
Drive drop-down [2]=3+5 (running total+number of drives in the 3rd segment)

The following are the key functions used by the Customize Logical Libraries Page (Continued):

2. Then the drive drop-down box is filled with the choices from available segments making up the total slack in following libraries.

The number of contiguous segments a library may pick up is the total slack below this library Start picking up with the first segment in the library below and incrementally add to the current number of drives, adding an option to the library's drop-down as each segment is traversed.

If the total number of slack segments below is n, then adding the current number of drives this library has to the number of drives in each of the next n contiguous segments will give the possible choices for
for the number of drives the user may select.

Using the above example, this would look like:
Drive drop-down [3]=8+2 (running total+number of drives in the 4th segment)
Drive drop-down [4]=10+4 ((running total+number of drives in the 5th segment)

One embodiment of the present invention was implemented in an IBM 3584 removable media tape library product to support a web-based configuration of mixed media libraries, the implementation was written in HTML and JavaScript.

While several embodiments and variations of the present invention for a method of modifying logical library configuration from a remote management application are described in detail herein, it should be apparent that the disclosure and teachings of the present invention will suggest many alternative designs to those skilled in the art.

We claim:

1. A method for modifying a logical library configuration from a remote management application which reduces the number of separate display panels a user has to view, and also reduces the number of pages requested from a server, comprising:
    providing a display panel which displays a configuration of all logical libraries of a similar media type in the single display panel comprising an allocation of a fixed number of hardware resources among all the logical libraries, the fixed number of hardware resources comprising a plurality of drives, a plurality of storage slots, and a plurality of control ports; and
    modifying the displayed configuration of all logical libraries of a similar media type within a configuration range available for the logical libraries of the similar media type by reallocating at least some of the fixed number of hardware resources among at least some of all the logical libraries, which results in the display panel displaying a reallocation of the remainder of the fixed number of hardware resources among the remainder of all the logical libraries, wherein for each separate logical library, the single display panel displays an allocated number of the plurality of drives, an allocated number of the plurality of storage slots, and an allocated number of the plurality of control ports, and wherein the validity of a particular hardware resource reallocation is checked by automatically reallocating the remainder of the fixed number of hardware resources among the remainder of all the logical libraries whenever the hardware resource allocation for one logical library is changed.

2. The method of claim 1, including configuring a media tape library into a configuration wizard which is launched in a pop-up window display by a parent HTML page.

3. The method of claim 2, including also creating a JavaScript object which initially represents the current library configuration, and subsequently represents any new library configuration as specified by a user.

4. The method of claim 3, wherein all web pages within the configuration wizard can access and update the JavaScript object, which avoids passing a large amount of data from display panel to display panel.

5. The method of claim 1, wherein initial data is retrieved from the server only once, and is then stored and optionally modified on the client computer, and is then submitted back to the server only once, after all configuration changes are completed.

6. The method of claim 1, wherein for a web-based application, reducing the number of display panels to one reduces network traffic and server processing because there is only one page request to the server instead of many page requests.

7. The method of claim 1, wherein a single display panel displays the characteristics of a plurality of logical libraries, and for each separate logical library, the single display panel displays allocated number of drives, allocated number of storage slots, and allocated number of control ports.

8. The method of claim 1, wherein an increase or decrease of a hardware allocation for a given library by a user affects the hardware allocations for other logical libraries of similar media type since the total available hardware for the partition is fixed, wherein if a hardware allocation is increased for a given library, then hardware allocations for other libraries of similar media type are decreased until the hardware allocation increase is satisfied.

9. The method of claim 1, wherein if the number of storage slots allocated to a given library is decreased, then the newly available storage slots resulting from the decrease are allocated to other logical libraries.

10. The method of claim 1, wherein a control port-to-drive mapping relationship exists between drives and controls ports which lays out a sequence of control ports and drives for a given partition, which mapping is represented by a string of Cs and Ds, and mappings are broken into segments where a segment is one or more Cs followed by one or more Ds and each logical library must have at least one segment, and choices that appear in drop-down boxes for drives and control ports are dependent upon the mapping, and adding a segment to a logical library also results in adding the number of drives and the number of control ports in the segment physically following the last segment for the logical library that is being increased.

* * * * *